US009179499B1

(12) United States Patent
Fang et al.

(10) Patent No.: US 9,179,499 B1
(45) Date of Patent: Nov. 3, 2015

(54) NETWORK SELECTION AT A WIRELESS COMMUNICATION DEVICE IN WIRELESS COMMUNICATIONS BASED ON TWO OR MORE RADIO ACCESS TECHNOLOGIES

(75) Inventors: Yonggang Fang, San Diego, CA (US); Xiaowu Zhao, Shenzhen (CN); Ting Lu, Beijing (CN)

(73) Assignee: ZTE (USA) Inc., Richardson, TX (US)

( * ) Notice: Subject to any disclaimer, the term of this patent is extended or adjusted under 35 U.S.C. 154(b) by 354 days.

(21) Appl. No.: 12/803,964

(22) Filed: Jul. 8, 2010

Related U.S. Application Data

(60) Provisional application No. 61/224,037, filed on Jul. 8, 2009.

(51) Int. Cl.
*H04W 88/06* (2009.01)
*H04W 76/02* (2009.01)
*H04W 36/14* (2009.01)
*H04W 36/00* (2009.01)
*H04W 36/18* (2009.01)
*H04W 48/20* (2009.01)
*H04W 48/18* (2009.01)

(52) U.S. Cl.
CPC ............. *H04W 88/06* (2013.01); *H04W 36/14* (2013.01); *H04W 76/02* (2013.01); *H04W 36/0005* (2013.01); *H04W 36/0011* (2013.01); *H04W 36/18* (2013.01); *H04W 48/18* (2013.01); *H04W 48/20* (2013.01)

(58) Field of Classification Search
CPC .................... H04W 52/0209; H04W 52/0216; H04W 52/0212; H04W 52/0222; H04W 52/0235; H04W 52/0258; H04W 74/00; H04W 88/06; H04W 76/02; H04W 36/14; H04W 36/18; H04W 36/0005; H04W 36/0011; H04W 48/18
USPC .............. 455/426.1, 436, 437, 438, 443, 444, 455/552.1; 370/331
See application file for complete search history.

(56) References Cited

U.S. PATENT DOCUMENTS

| | | | |
|---|---|---|---|
| 7,257,403 B2 | 8/2007 | Nikkelen | |
| 7,554,949 B2 | 6/2009 | Chen | |
| 7,746,836 B2 | 6/2010 | Jentz et al. | |
| 2004/0063426 A1* | 4/2004 | Hunkeler | 455/426.1 |
| 2006/0029096 A1 | 2/2006 | Babbar et al. | |
| 2006/0148486 A1* | 7/2006 | Kim et al. | 455/456.1 |
| 2006/0270411 A1* | 11/2006 | Grayson | 455/444 |
| 2009/0034452 A1* | 2/2009 | Somasundaram et al. | 370/328 |
| 2009/0052384 A1 | 2/2009 | Zisimopoulous et al. | |
| 2009/0117891 A1* | 5/2009 | Chou | 455/423 |
| 2010/0046428 A1* | 2/2010 | Lee et al. | 370/328 |
| 2010/0067434 A1* | 3/2010 | Siu et al. | 370/328 |
| 2010/0172338 A1* | 7/2010 | Chou et al. | 370/345 |
| 2011/0014916 A1* | 1/2011 | Cho et al. | 455/437 |
| 2011/0065435 A1 | 3/2011 | Pancorbo Marcos et al. | |
| 2011/0080870 A1 | 4/2011 | Bhalla et al. | |

OTHER PUBLICATIONS

"Band Class Specification for cdma2000 Spread Spectrum Systems Revision E," 3rd Generation Partnership Project 2 (3GPP2), 3GPP2 No. C.S0057-E v1.0, 190 pages, Oct. 2010.

(Continued)

*Primary Examiner* — Anthony Addy
*Assistant Examiner* — Edd Rianne Plata
(74) *Attorney, Agent, or Firm* — Perkins Coie LLP

(57) ABSTRACT

Techniques, apparatuses, and systems can include mechanisms for network selection.

27 Claims, 7 Drawing Sheets

(56) References Cited

OTHER PUBLICATIONS

"Band Class Specification for cdma2000 Spread Spectrum Systems," 3rd Generation Partnership Project 2 (3GPP2), 3GPP2 No. C.S0057-0 v1.0, 89 pages, Feb. 2004.

"Band Class Specification for cdma2000 Spread Spectrum Systems," 3rd Generation Partnership Project 2 (3GPP2), 3GPP2 No. C.S0057-A v1.0, 123 pages, Jan. 2006.

"Band Class Specification for cdma2000 Spread Spectrum Systems," 3rd Generation Partnership Project 2 (3GPP2), 3GPP2 No. C.S0057-B v1.0, 129 pages, Aug. 2006.

"Band Class Specification for cdma2000 Spread Spectrum Systems," 3rd Generation Partnership Project 2 (3GPP2), 3GPP2 No. C.S0057-C v1.0, 180 pages, Jul. 2008.

"Band Class Specification for cdma2000 Spread Spectrum Systems," 3rd Generation Partnership Project 2 (3GPP2), 3GPP2 No. C.S0057-D v1.0, 180 pages, Sep. 2009.

"E-UTRAN—cdma2000 Connectivity and Interworking: Air Interface Specification," 3rd Generation Partnership Project 2 (3GPP2), 3GPP2 No. C.S0087-0 v1.0, 219 pages, May 2009.

"E-UTRAN—eHRPD Connectivity and Interworking: Core Network Aspects," 3rd Generation Partnership Project 2 (3GPP2), 3GPP2 No. X.S0057-0 v1.0, 154 pages, Apr. 2009.

"E-UTRAN—eHRPD Connectivity and Interworking: Core Network Aspects," 3rd Generation Partnership Project 2 (3GPP2), 3GPP2 No. X.S0057-0 v3.0, 195 pages, Sep. 2010.

"E-UTRAN—eHRPD Connectivity and Interworking: Core Network Aspects," 3rd Generation Partnership Project 2 (3GPP2), 3GPP2 No. X.S0057-0 v2.0, 182 pages, Dec. 2009.

"IP-based Service Architecture—System Requirements," 3rd Generation Partnership Project 2 (3GPP2), 3GPP2 No. S. R0057-0 v1.0, 12 pages, Jul. 2002.

Carlson, J., "PPP Vendor Protocol," Network Working Group Internet-Draft, 10 pages, Aug. 2004.

\* cited by examiner

NETWORK SELECTION AT A WIRELESS COMMUNICATION DEVICE IN WIRELESS COMMUNICATIONS BASED ON TWO OR MORE RADIO ACCESS TECHNOLOGIES

PRIORITY CLAIM AND RELATED PATENT APPLICATION

This patent document claims the benefits of U.S. Provisional Application No. 61/224,037 entitled "SOFT HANDOFF FROM CDMA-BASED HRPD NETWORK TO E-UTRAN NETWORK" and filed Jul. 8, 2009. The entire disclosure of the above application is incorporated by reference as part of the disclosure of this document.

BACKGROUND

This document relates to wireless communications in wireless communication systems, including interworking mechanisms in wireless communications based on two or more radio access technologies.

Wireless communication systems can include a network of one or more base stations to communicate with one or more wireless devices such as a mobile device, cell phone, wireless air card, mobile station (MS), user equipment (UE), access terminal (AT), or subscriber station (SS). Each base station can emit radio signals that carry signaling and data such as voice data and other data content to wireless devices. A base station can be referred to as an access point (AP) or access network (AN) or can be included as part of an access network. A wireless communication system can include one or more radio access network controllers to control one or more base stations.

A wireless device can be configured as a multi-mode device that operates with two or more different wireless technologies for communications. Examples of various wireless technologies include Long-Term Evolution (LTE), Code division Multiple Access (CDMA) such as CDMA2000 1x, and High Rate Packet Data (HRPD). In some implementations, a wireless communication system can include multiple networks using different wireless technologies such as Evolved HRPD (eHRPD) wireless technology and Evolved Universal Terrestrial Rradio Access Network or Evolved UMTS Terrestrial Radio Access Network (E-UTRAN) wireless technology. Wireless communication systems using different wireless technologies can be implemented to include interworking mechanisms which enable communication services to a wireless device via the different wireless technology communication systems and allow wireless devices to move across different communication systems while maintaining wireless communication services to the wireless devices.

SUMMARY

This document describes technologies for network selection at a wireless communication device in wireless communications based on two or more different wireless radio access technologies, including network selection and reselection for eHRPD and E-UTRAN interworking.

In one aspect, a method for wireless communications is provided to include providing a wireless communication device that is capable of communicating with two or more wireless communication networks based on different radio access technologies (RATs), respectively. Each wireless communication network includes base stations that provide wireless communication services based on a respective radio access technology (RAT) of the wireless communication network. This method includes operating each base station of a wireless communication network based on a respective RAT to send out a signaling message that indicates presence or absence of base stations of other wireless networks based on other RATs; and controlling the wireless communication device currently being serviced by a first wireless network based on a first RAT not to search for a base station of a second wireless network based on a second RAT when the signaling message indicates absence of base stations of the second wireless network, and to search for a base station of the second wireless network when the signaling message indicates presence of base stations of the second wireless network.

In another aspect, a system for wireless communications is provided to include two or more wireless networks based on different radio access technologies (RATs), respectively. Each wireless network includes base stations that provide wireless communication services based on a respective radio access technology (RAT) of the wireless network, and the wireless networks provide wireless communication services to wireless communication devices that are capable of communicating with the wireless networks based on the different RATs. This system includes a signaling mechanism in each of the wireless communication networks to send out a signaling message from each wireless network that indicates presence or absence of base stations of other wireless networks based on other RATs; a search mechanism that causes each wireless communication device currently being serviced by a first wireless network based on a first RAT not to search for a base station of a second wireless network based on a second RAT when the signaling message indicates absence of base stations of the second wireless network, and to search for a base station of the second wireless network when the signaling message indicates presence of base stations of the second wireless network; and a handoff mechanism that switches the wireless communication device from communicating with the first wireless network to communicating with the second wireless network after the base station of the second wireless network is found.

In another aspect, a method for wireless communications is provided to include transmitting information to a wireless device to indicate an availability of other-radio access' technology (RAT) cells; and using a mechanism to distribute wireless devices searches for other-RAT cells to reduce congestion of an access channel of a wireless communication system. The mechanism uses different wake up times to operate wireless devices to wake up differently to search for other-RAT cells.

In another aspect, inter-radio access technology (RAT) interworking techniques can include transmitting information to a wireless device to indicate an availability of other-radio access technology (RAT) cells so that the wireless device can perform searching for other RAT network only when it receives the other RAT available indication from eHRPD network. In this way, the wireless device is not necessary to periodically search for other RAT where it is not located in the other RAT coverage.

These implementations can include operating a wireless device to perform an inter-RAT network selection/reselection based on a preferred roaming list configuration. These implementations can include operating a first wireless device to wake up at a first time to receive control channel information and to search for a other RAT wireless cell only when it receives an indication of other RAT available in the neighbor area; and operating a second wireless device to wake up at a different, second, time to receive control channel information and to search for a other RAT wireless cell only when it receives an indication of other RAT available in the neighbor area.

In another aspect, the inter-RAT interworking techniques can include using a mechanism to evenly distribute the starting time of wireless devices searching for other-RAT cells to reduce congestion of an access channel of a wireless communication system. Such a mechanism can use different native wake up times to operate wireless devices to wake up differently to search for other-RAT cells. Other implementations can include corresponding systems, apparatus, and computer programs, configured to perform the actions of the techniques, encoded on computer readable mediums.

In yet another aspect, techniques, apparatuses, and systems can include mechanisms for postponing the starting network soft selection/reselection via randomized measurement backoff period. The randomized measurement backoff timer could be used to extend the wake-up timer value so as to provide the larger range of random access starting time to avoid the access collision.

The details of one or more implementations are set forth in the drawings, the description and the claims.

BRIEF DESCRIPTION OF THE DRAWINGS

Like reference symbols in the various drawings indicate like elements.

DETAILED DESCRIPTION

In certain areas, two or more wireless networks based on different radio access technologies are deployed to provide wireless communication services. A wireless communication device designed to operate under the different radio access technologies can be served by such different wireless networks. In various circumstances, the hand off between the different wireless networks is needed while maintaining the continuity of the wireless communication services to such a wireless communication device. Interworking mechanisms can be provided to enable communication services to the wireless device via the different wireless technology communication systems. One of the technical issues in interworking is to reduce the amount of operations or processing preformed by the wireless device to provide efficient handoff from one network to another while preserving the battery power of the wireless device such as mobile devices. The methods and systems described in this document can be implemented in ways that provide efficient handoff of a wireless device between different networks based on different radio access technologies.

Figure 1:
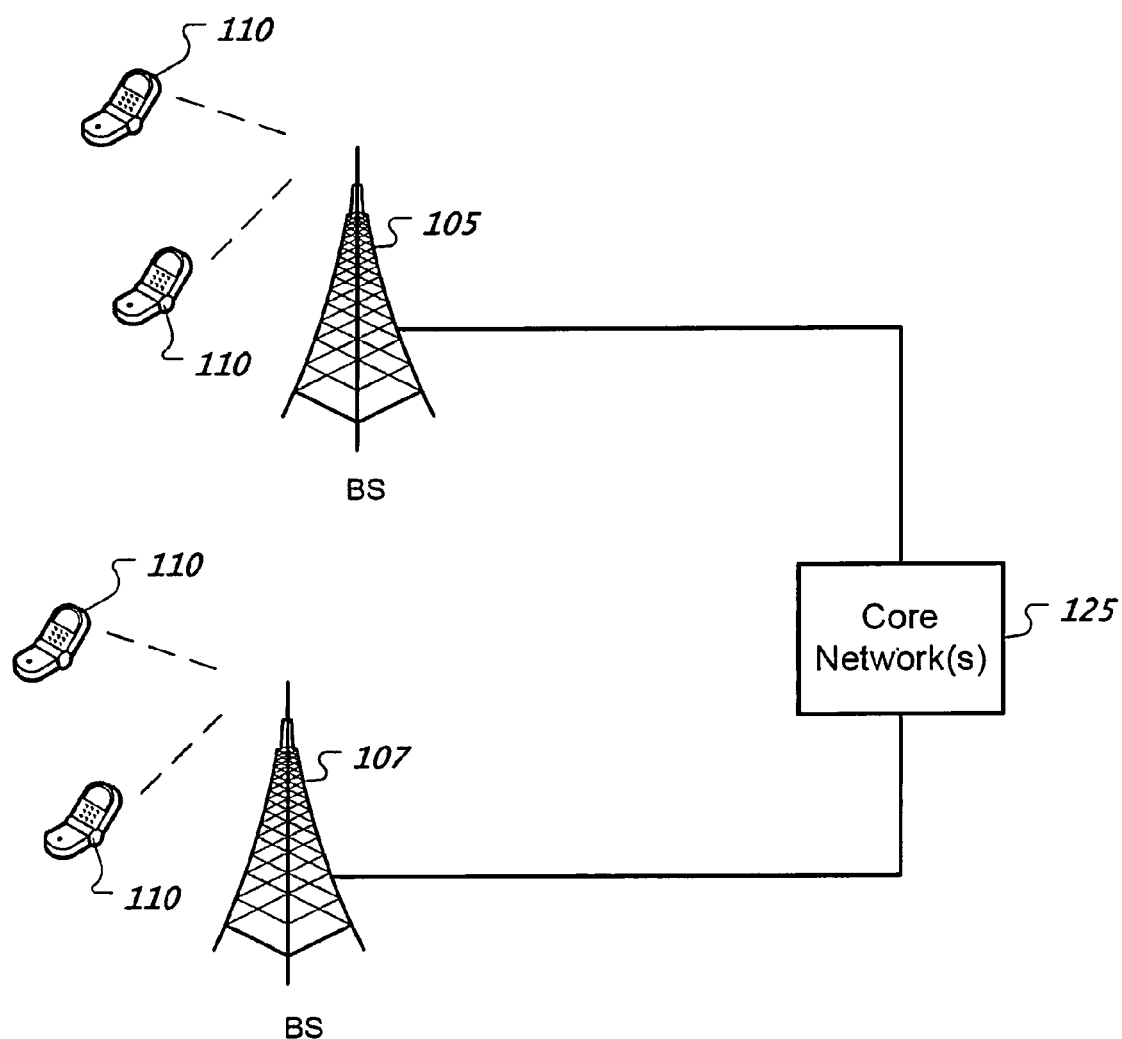
FIG. 1 shows an example of a wireless communication system.

FIG. 1 shows an example of a wireless communication system. A wireless communication system can include one or more base stations (BSs) 105, 107 and one or more wireless devices 110. A base station 105, 107 can transmit a signal on a forward link (FL), or a downlink (DL), to one or more wireless devices 110. A wireless device 110 can receive a signal from a base station via the respective forward link (FL) or a downlink (DL), and can transmit a signal on a reverse link (RL), or uplink (UL), to one or more base stations 105, 107. A wireless communication system can include one or more core networks 125 to control one or more base stations. In some implementations, a wireless communication system can include different access networks (ANs) for different radio access technologies (RATs).

Base stations 105, 107 can be configured to operate based on or use same or different wireless technologies. For example, one base station 105 can use E-UTRAN technology and a different base station 107 can use eHRPD technology. Examples of wireless communication systems that can implement the present techniques and systems include, among others, wireless communication systems based on Code Division Multiple Access (CDMA) such as CDMA2000 1x, Evolved High Rate Packet Data (eHRPD), Evolved Universal Terrestrial Radio Access Network (E-UTRAN), the Worldwide Interoperability for Microwave Access (WiMAX) technology and a WiFi technology under an IEEE 802.11 standard. A wireless device 110 can be configured to use one or more RATs such as eHRPD, and E-UTRAN.

Figure 2:
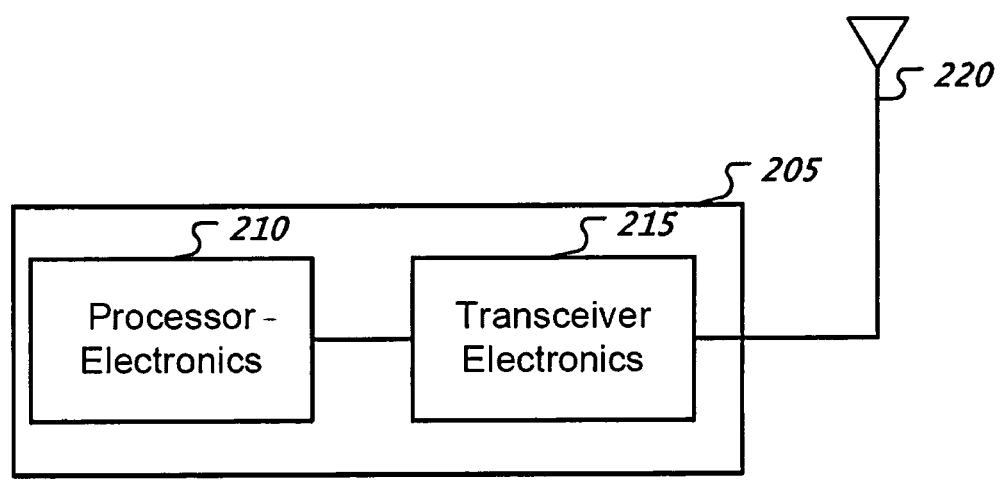
FIG. 2 shows an example of a radio station architecture.

FIG. 2 shows an example of a radio station architecture for a wireless communication device 110 or a base station 105 or 107 in FIG. 1. A radio station 205 in this example includes processor electronics 210 such as a microprocessor that implements methods such as one or more of the wireless communication techniques presented in this document. The radio station 205 includes transceiver electronics 215 to send and/or receive wireless signals over one or more communication interfaces such as an antenna 220. The radio station 205 can include other communication interfaces for transmitting and receiving signaling and data. The radio station 205 can include one or more memories configured to store information such as data and/or instructions.

In various implementations, the network selection and reselection mechanism is provided to perform selection and reselection within the same technology and between different radio access technologies. Network selection/reselection between different wireless technologies such as HRPD and E-UTRAN is performed by the wireless device in the Idle state. When a wireless device is located in the boundary of two different RAT cells, the network selection/reselection mechanism in the wireless device would guide it to select the preferred and available wireless network.

Interworking network selection mechanisms can be implemented to include collecting other RAT network information, the radio signal measurement, acquiring the other RAT network and performing registration in the other RAT network. The other RAT network information and selection preference could be collected by the wireless device in various ways. For example, in an eHRPD-E-UTRAN interworking case, the eHRPD serving access network can be used to broadcast the interworking technologies neighbor cells information (E-UTRAN) in OtherRATNeighborList message, which includes OtherRATType, relative ServingPriority to eHRPD network, E-UTRAN frequency number, etc. When an eHRPD-E-UTRAN dual mode wireless device attaches to eHRPD and receives the other RAT information from OtherRATNeighborList message, the device performs searching and measuring E-UTRAN if E-UTRAN priority is higher than the current eHRPD network. If the E-UTRAN signal is found and its radio strength meets the switching criteria, the wireless device would perform idle handoff to E-UTRAN network.

For another example, the wireless device pre-stores or downloads over the air the interworking network information into its Preferred Roaming List (PRL) and uses Multi-Mode System Selection (MMSS) mechanism to camp on the most preferred and available network. When an eHRPD-E-UTRAN dual mode wireless device is attaching to eHRPD network, the attached wireless device could search for E-UTRAN if eHRPD network is not the most preferred network according to its priority in PRL. When E-UTRAN network is found and the pilot strength measurement meets the switching criteria, the eHRPD-E-UTRAN dual mode wireless device will perform idle handoff to E-UTRAN.

In the above examples for collecting other RAT information, a MMSS capable wireless device may keep periodically searching for E-UTRAN network when it is attaching to eHRPD network and E-UTRAN has higher priority than eHRPD defined in PRL. When an eHRPD-E-UTRAN dual mode wireless device is attaching to eHRPD network and enters E-UTRAN coverage hole, the dual mode wireless device may constantly search for E-UTRAN signal. This mode of searching consumes the device power and can significantly shorten the battery life of the dual mode wireless device. A MMSS capable wireless device may store outdated interworking parameter and this may cause a wireless device attaching to eHRPD to acquire the E-UTRAN network slowly.

One example of a system for wireless communications is provided here to include a mechanism to inform wireless devices of the status of the neighboring, cells as to whether a different RAT network is present. With this information, the wireless devices are controlled to only conduct the search for another RAT network when the other RAT network is actually present. Such a system includes two or more wireless networks based on different radio access technologies (RATs), respectively. Each wireless network includes base stations that provide wireless communication services based on a respective radio access technology (RAT) of the wireless network, and the wireless networks provide wireless communication services to wireless communication devices that are capable of communicating with the wireless networks based on the different RATs. Notably, a signaling mechanism is provided in each of the wireless communication networks to send out a signaling message from each wireless network that indicates presence or absence of base stations of other wireless networks based on other RATs. A search mechanism is provided in this system to cause each wireless communication device currently being serviced by a first wireless network based on a first RAT not to search for a base station of a second wireless network based on a second RAT when the signaling message indicates absence of base stations of the second wireless network, and to search for a base station of the second wireless network when the signaling message indicates presence of base stations of the second wireless network. This system includes a handoff mechanism that switches the wireless communication device from communicating with the first wireless network to communicating with the second wireless network after the base station of the second wireless network is found.

In the specific example of the above eHRPD-E-UTRAN interworking, the serving eHRPD access network signals the existence of a non-HRPD neighbor site or base station to a wireless device. Such a wireless transmissions can include at least one information bit to indicate existence of the E-UTRAN network. When this information bit indicates the presence of the E-UTRAN network, the wireless device is operated to conduct the search and measurements of the E-UTRAN network. Otherwise, if the information bit indicates that the E-UTRAN network is absent, the wireless device is operated to maintain its service with the serving eHRPD network without wasting time and power for the search and measurements of the E-UTRAN network. In some implementations, the access networks can send out a singling message with two information bits to indicate the non-HRPD neighbor cell existence, one for indication of existence of E-UTRAN network, and the other bit could be used for indication of existence or availability of other RAT networks such as WiMAX or WiFi network.

When an eHRPD-E-UTRAN dual mode wireless device attaches to eHRPD network and receives the indication of E-UTRAN available in the neighbor cells broadcast from eHRPD network, the wireless device can be operated to begin searching for E-UTRAN network. Otherwise, the wireless device will remain in the eHRPD network and not perform E-UTRAN network searching. In this way, the searching for the E-UTRAN network is reduced and the battery life of the dual mode wireless device can be extended.

In some implementations, eHRPD network can use one bit to indicate whether eHRPD access network broadcast OtherRATNeighborList message to help a wireless device such as a MMSS wireless device to speed up acquisition process and reduce the system acquired time. When the MMSS capable dual mode wireless device receives the E-UTRAN network available indication and the OtherRATNeighborList message, the dual mode wireless device can use the system information received from the OtherRATNeighborList to perform network searching for E-UTRAN network.

In some implementation, the E-UTRANAvailable bit and OtherRATNeighborListAvailable bit can be combined into OtherRATAvailable bit. An eHRPD-E-UTRAN dual mode wireless device, whether it is MMSS capable or not, can perform the interworking network searching only when it receives OtherRATAvailable bit set to 1. Table 1 shows an example of QuickConfig message with OtherRATAvailable bit and OtherRATSignature field.

TABLE 1

| Field | Length (bits) |
|---|---|
| MessageID | 8 |
| ... | |
| OtherRATAvailable | 0 or 1 |
| OtherRATSignature | 0 or 6 |

A wireless communication system can trigger a dual mode wireless device to start Inter-RAT searching to speed up system acquisition. A modified QuickConfig message can include one OtherRATAvailable bit to indicate the availability of other RAT network such as E-UTRAN. If OtherRATAvailable bit is set to "1", this value indicates the E-UTRAN cell is a neighbor of eHRPD cell. The dual mode MMSS capable wireless device can then perform the network selection based on its PRL information.

If OtherRATAvailable bit is set to "1", eHRPD access network can broadcast "OtherRATNeighborList" message over the Control Channel (CC). In some implementations, the eHRPD access network may set OtherRATAvalibale to "1", but not broadcast Other RAT neighbor cell information. In this case, the MMSS capable wireless device can use MMSS information stored in its PRL to perform the interworking network selection.

The OtherRATSignature bits in the QuickConfig message can be used to indicate whether the OtherRATNeighborList has been changed since last transmission. Each time that eHRPD access network broadcasts OtherRATNiehgborList message, the message is associated with a signature. When the eHRPD access network changes any parameter in OtherRATNeighborList message, it should change the signature, e.g., by increasing the signature field. The dual mode wireless device can use the signature field to decide whether the parameters in OtherRATNeighborList message have been changed or not.

If the dual mode wireless device receives the QuickConfig message with OtherRATAvailable being set to "1", and the OtherRATSignature field different from stored value, it shall update stored other RAT neighbor list information using the parameters in the OtherRATNeighborList message. Table 2 gives an example of an OtherRATNeighborList Message which is broadcast by eHRPD access network.

TABLE 2

OtherRATNeighborList Message

| Field | Length (bits) |
|---|---|
| MessageID | 8 |
| OtherRATNeighborCount | 5 |
| OtherRATNeighborCount occurrences of the following fields { | |
| OtherRATNeighborType | 8 |
| OtherRATNeighborRecordLength | 8 |
| OtherRATNeighborRecord } | OtherRATNeighborRecordLength × 8 |
| Reserved | 0-7 (as needed) |

In Table 2, the message ID field is used to identify the message type of the OtherRATNeighborList message. The OtherRATNeighborCount indicates the number of other RAT records included in the message. The RATType is used to indicate the other RAT technology such as E-UTRAN, WiMAX or WLAN. The OtherRATNeighborRecordLength indicates the length of the other RAT neighbor record in the unit of 8 bits.

The above examples illustrate a method for wireless communications for providing efficient handoff between networks of different RATs. This method includes providing a wireless communication device that is capable of communicating with two or more wireless communication networks based on different radio access technologies (RATs), respectively. Each wireless communication network includes base stations that provide wireless communication services based on a respective radio access technology (RAT) of the wireless communication network. Each base station of a wireless communication network based on a respective RAT is operated to send out a signaling message that indicates presence or absence of base stations of other wireless networks based on other RATs. The wireless communication device currently being serviced by a first wireless network based on a first RAT is controlled not to search for a base station of a second wireless network based on a second RAT when the signaling message indicates absence of base stations of the second wireless network, and is controlled to search for a base station of the second wireless network when the signaling message indicates presence of base stations of the second wireless network. In this method, after the base station of the second wireless network is found, the wireless communication device from communicating with the first wireless network to communicating with the second wireless network.

In one implementation of the above method, the signaling message can include a designated bit that indicates presence or absence of base stations of other wireless networks based on other RATs. In the wireless communication device, a list of neighboring base stations of other wireless networks based on other RATs is provided. When the designated bit indicates presence of base stations of other wireless networks based on other RATs, the wireless communication device is operated or controlled to search for a second base station based on a second RAT based on the list.

In another implementation of the above method, each base station of a wireless communication network based on a respective RAT is operated to send out a second signaling message that includes information on a list of neighboring base stations of other wireless networks based on other RATs. When the designated bit indicates presence of base stations of other wireless networks based on other RATs, the wireless communication device is operated to search for a second base station based on a second RAT based on the information on the list of neighboring base stations of other wireless networks based on other RATs in the second signaling message.

Under certain circumstances, a large number of wireless devices at a location may simultaneously perform the network interworking searching and may lead to access channel congestion or even access failure. As a specific example, when many eHRPD-E-UTRAN dual mode wireless devices are approaching to an E-UTRAN cell from eHRPD cells such as in a fast moving train, the current interworking network selection algorithm could cause these wireless devices to acquire and send access probes to E-UTRAN network at same time. Due to the limited access channel capacity, the multiple simultaneous accesses may create the access channel congestion and even cause multiple access failure.

One technique to address this issue is to make different wireless devices to wake up at different times and thus to perform the interworking search at different times. A specific implementation of this technique is to use a randomized timer in the unit of control channel cycle for each dual mode wireless device. Different dual mode wireless devices can have different randomized wakeup times for Inter-RAT soft acquisition. In eHRPD specification, an Idle State Protocol can include different states such as an Inactive State, a Sleep State, a Monitor State, and a Connection Setup State. In the Sleep State, a wireless device may stop monitoring the Control Channel, may shut down processing resource to reduce the battery power consumption. When the wireless device is in the Monitor State, it continuously monitors the Control Channel.

In the proposed randomized wake-up time for interworking soft selection, the wakeup time is used to control receiving control channel information such as Control Channel messages and searching for Other-RAT neighbor cells. Since each wireless device has its own wakeup time to transit from Sleep State to Monitor State, which is randomized by its Session-Seed. The nature of HRPD randomized wake-up time avoids simultaneous accessing by different wireless devices. This technique of using different wake-up times of the wireless devices can facilitate the efficient handover and extend the battery life in the inter network searching. The above operating different wireless communication devices to have different randomized wake-up times eliminates the need for having a separate designated timer to control wake-up times of the different wireless communication devices.

To further extend the range of randomized wake-up time, each of the different wireless communication devices can be controlled to delay the search for a base station based on a different RAT by a backoff timer to extend a delay after a respective wake-up time for the wireless communication device. In the example of the eHRPD-E-UTRAN interworking, a back off timer, "the other RAT measurement backoff timer", can be used. When a dual mode wireless device wakes up, it may start to search for Other-RAT neighbor cell or not, which depends on its Other-RAT measurement backoff timer. If the Other-RAT measurement backoff timer expires when the wireless device wakes up from Sleep State, the dual mode wireless device will start to measure and acquire Other-RAT cells after receiving eHRPD Quick Config message and Sector Parameter message and no Paging message received. If the Other-RAT measurement backoff timer has not expired, the dual mode wireless device would go back to sleep. In this way, it will prevent the dual mode wireless device from searching for E-UTRAN network in the middle of its sleeping period in eHRPD. The Other-RAT measurement backoff timer may be implemented as a counter based on the control channel cycle. Assuming the maximum backoff timer is 5 control channel cycles, each device can be assigned a random counter for the backoff timer between 0 to 5 control channel cycles. This randomized backoff timer and the randomized wake-up times are combined to reduce the possibility that different wireless devices to conduct interworking search at the same time.

In some implementations, if the dual mode wireless device acquires Other-RAT network while being served by eHRPD network, the device will leave the serving eHRPD network and register with Other-RAT network. Otherwise, e.g., if the device fails to acquire Other-RAT cells, the dual mode wireless device will stay in eHRPD network and go back to Sleep State.

Figure 3:
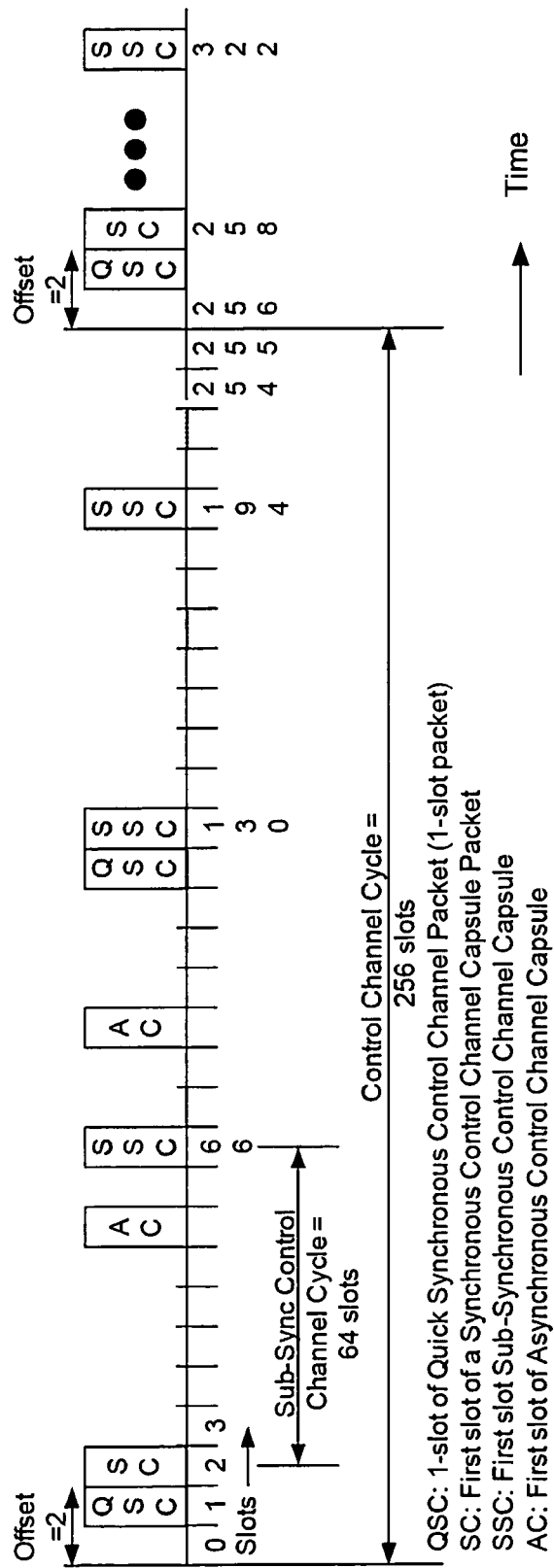
FIG. 3 shows an example of a forward link transmission sequence.

FIG. 3 shows an example of a transmission sequence in eHRPD. A base station can transmit a transmission sequence 305 to one or more wireless devices. The transmission sequence 305 can include one or more of: QSC: 1-slot of Quick Synchronous Control Channel Packet (1-slot packet), SC: First slot of a Synchronous Control Channel Capsule Packet, SSC: First slot Sub-Synchronous Control Channel Capsule, and AC: First slot of Asynchronous Control Channel Capsule. The transmission sequence 305 can include control channel (CC) information such as QuickConnect (QC) information.

Figure 4:
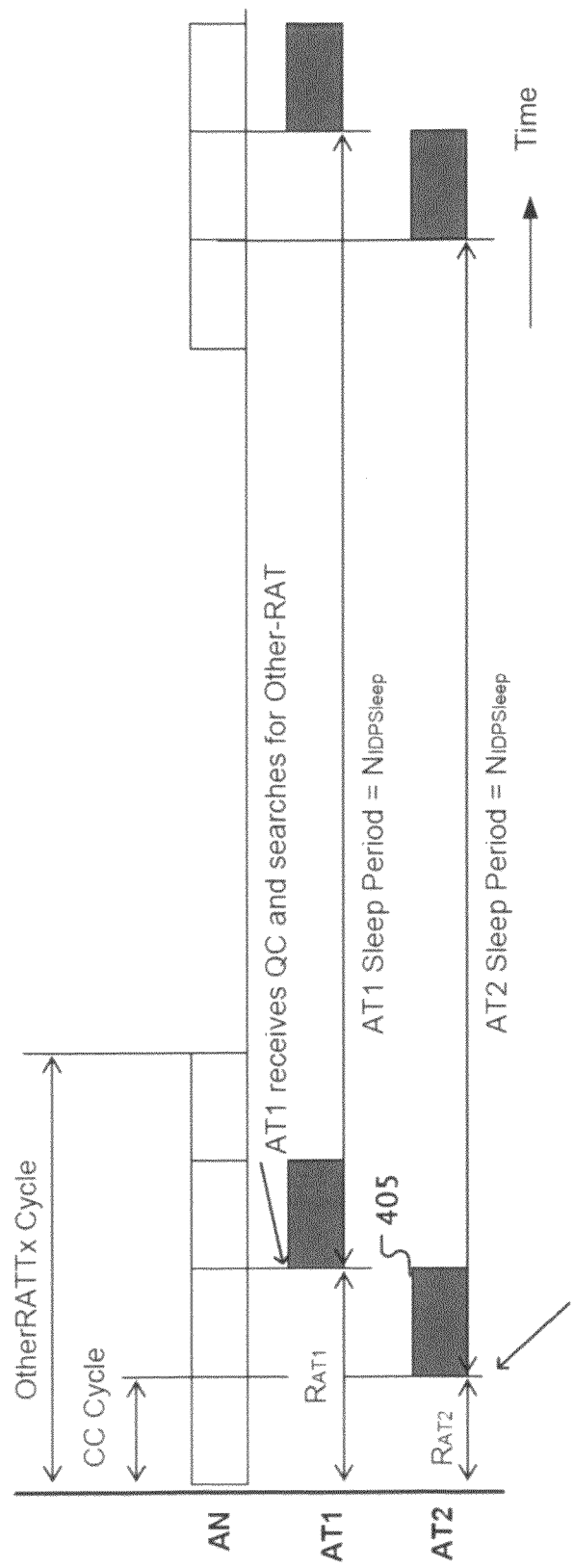
FIG. 4 shows an example of wireless device activity where wakeup time is aligned with a control channel (CC) cycle.

FIG. 4 shows an example of dual mode wireless device activity where wakeup time is aligned with a CC cycle. Two wireless devices AT1 and AT2 are illustrated in the example. AT1 can receive QC information and can search for Other-RAT. AT2 receives data 405 that can include a QC and can search for Other-RAT. In some implementations, AT2 receives data 405 such as a transmission sequence 305 shown in FIG. 3. In this example, the wake-up times of the two devices AT1 and AT2 are based on control channel cycles.

Figure 5:
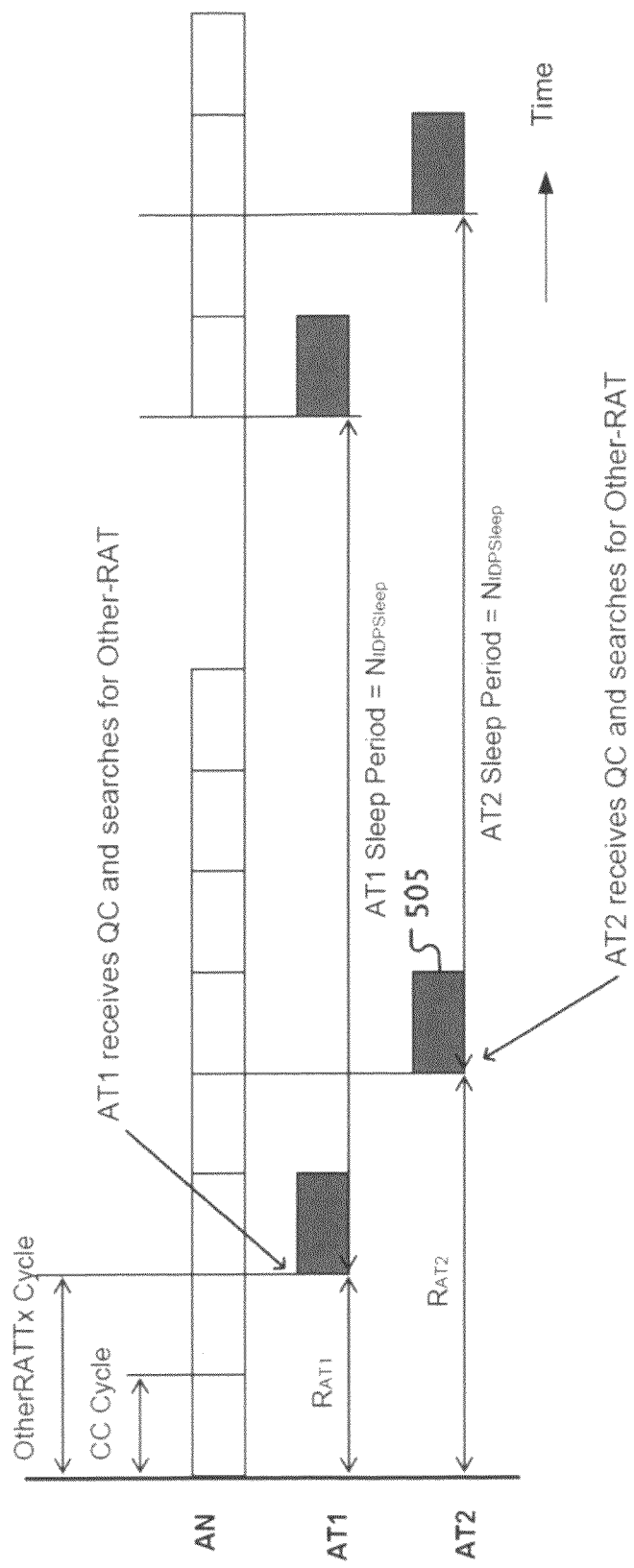
FIG. 5 shows an example of wireless device activity where wakeup time is aligned with an OtherRATTx cycle.

FIG. 5 shows an example of wireless device activity where the wakeup time is aligned with an OtherRATTx cycle and extended by using OtherRAT measurement backoff timer. AT1 can receive QC and can search for Other-RAT. AT2 receives data 505 that can include a QC and can search for Other-RAT. In some implementations, AT2 receives data 505 such as a transmission sequence 305 shown in FIG. 3.

Figure 6:
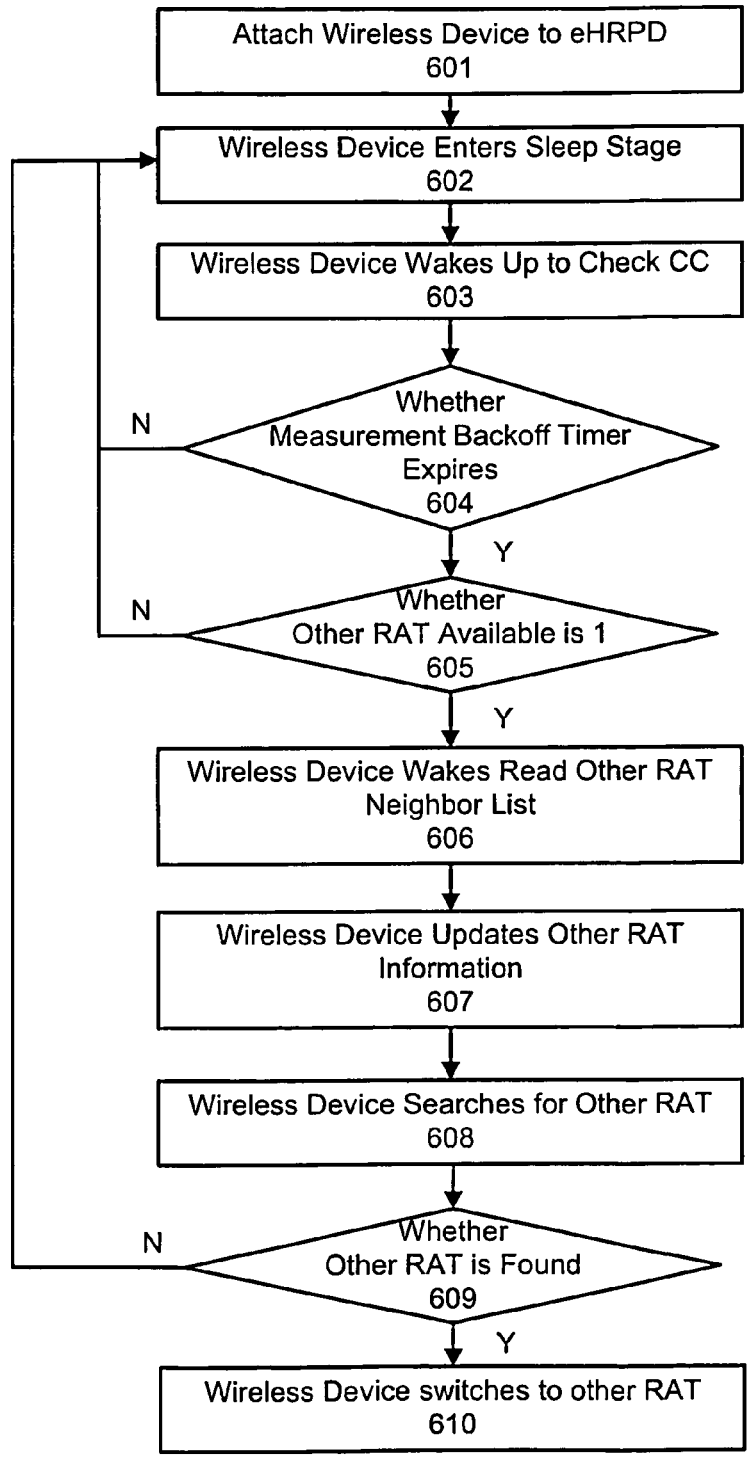
FIG. 6 shows an example of soft selection and reselection procedure in a wireless communication device.

FIG. 6 shows an example of soft selection and reselection procedure in a wireless communication device based on the native wakeup timer with the measurement backoff timer. At 601, the wireless device is attaching to eHRPD network in the idle state. At 602, the wireless device calculates the sleep and wakeup period using the randomization function. The sleep and wakeup periods are aligned with CC cycle. When it is in the sleep period, the wireless device goes to sleep to save battery life and setup the wakeup timer. At 603, when the wakeup timer expires, the wireless device starts to monitor the control channel and processes regular HRPD overhead messages. At 604, if the measurement backoff timer does not expire, the wireless device will go back to sleep. Otherwise, at 605, the wireless device checks the OtherRATAvailable bit. If it is not set to 1, the wireless device will go back to sleep. Otherwise, at 606, the wireless device checks OtherRAT-NeighborList message. At 607, the wireless device updates the stored other RAT neighbor list with latest received one if the signature in the OtherRATNeighborList is different from the stored one. At 608, the wireless device searchers for the other RAT. At 609, if the other RAT is not found, the wireless device will go back to sleep. Otherwise, at 610, the wireless device is switched to the other RAT network and performs registration there.

A mechanism for randomizing wakeup time for Inter-RAT Soft Acquisition can include coordinating an access network and an access terminal in an access terminal's transitions from the Sleep State to the Monitor State in time to send and receive, the synchronous capsule sent in each Control Channel cycle (or OtherRATTx) C satisfying $$(C+R) \bmod N_{IDPSleep} = 0,$$

where C is the number of Control Channel (or OtherRATTx) cycles since the beginning of CDMA system time. In some implementations, if PreferredControlChannelCycleEnabled (or PreferredOtherRATTxCycleEnabled) is equal to '0', then R is the result of applying the hash function using the following parameters:
Key=SessionSeed,
Decorrelate=6×SessionSeed[11:0],
N=$N_{IDPSleep}$, where SessionSeed is given as public data of the Address Management Protocol.

If PreferredControlChannelCycleEnabled (or PreferredOtherRATTxCycleEnabled) is equal to '1', then R is set to PreferredControlChannelCycle.

The above examples use a bit to indicate the availability of Other-RAT cells and to can minimize changes on the existing HRPD access network. The MMSS capable wireless devices is controlled to perform the inter-RAT network selection only when it receives the indication of other RATAvailable in the neighbor cells. The wireless device wake up time is used to perform the soft selection of Other-RAT to reduce simultaneous access by large number of wireless devices and to evenly distribute the access to Other-RAT, thus avoiding congestion of the access channel. The combination of the receiving QC, SPM and/or OtherRATNeighborList messages with acquiring other-RAT cell can also reduce the number of access terminal's wake-ups and save mobile battery life.

Figure 7:
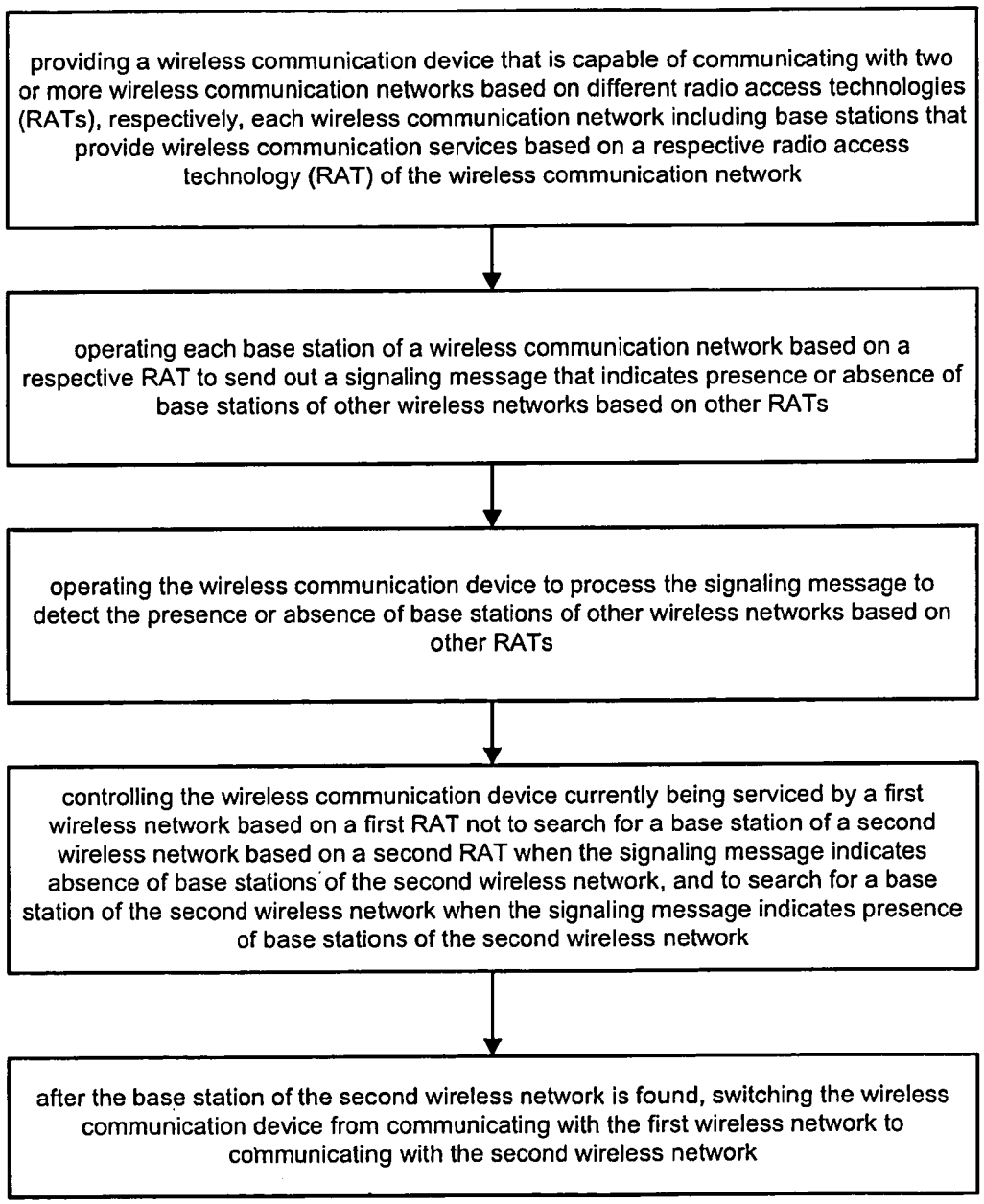
FIG. 7 shows an example of selecting a network in a wireless communication device that communicates with different networks base don different RATs.

FIG. 7 shows an example of selecting a network in a wireless communication device that communicates with different networks base don different RATs. This method includes providing a wireless communication device that is capable of communicating with two or more wireless communication networks based on different radio access technologies (RATs), respectively, operating each base station of a wireless communication network based on a respective RAT to send out a signaling message that indicates presence or absence of base stations of other wireless networks based on other RATs, operating the wireless communication device to process the signaling message to detect the presence or absence of base stations of other wireless networks based on other RATs, controlling the wireless communication device currently being serviced by a first wireless network based on a first RAT not to search for a base station of a second wireless network based on a second RAT when the signaling message indicates absence of base stations of the second wireless network, and to search for a base station of the second wireless network when the signaling message indicates presence of base stations of the second wireless network, and after the base station of the second wireless network is found, switching the wireless communication device from communicating with the first wireless network to communicating with the second wireless network.

Only a few examples and implementations are disclosed. Variations, modifications, and enhancements to the described examples and implementations and other implementations can be made based on what is disclosed.

What is claimed is:

1. A method for wireless communications, comprising:
providing a wireless communication device that is capable of communicating with two or more wireless communication networks based on different radio access technologies (RATs), respectively, each wireless communication network including base stations that provide wireless communication services based on a respective radio access technology (RAT) of the wireless communication network,
operating each base station of a wireless communication network based on a respective RAT to send out a signaling message that indicates absence of base stations of other wireless networks based on other RATs, wherein the signaling message indicates absence of base stations of the second wireless network when the second wireless network does not exist;
controlling the wireless communication device currently being serviced by a first wireless network based on a first RAT not to search for a base station of a second wireless network based on a second RAT when the signaling message indicates absence of base stations of the second wireless network, and to search for a base station of the second wireless network when the signaling message indicates presence of base stations of the second wireless network; and
operating the wireless communication device to have a different randomized wake-up time than that of other wireless communication devices served by the wireless communication network, the different randomized wake-up time causing the wireless communication device to start the search for a base station of the second wireless network at different time from other wireless communication devices when the signaling message indicates presence of base stations of the second wireless network.

2. The method as in claim 1, wherein:
the signaling message includes a designated bit that indicates presence or absence of base stations of other wireless networks based on other RATs.

3. The method as in claim 1, wherein:
the first wireless network is based on the Evolved High Rate Packet Data (eHRPD) radio access technology as the first RAT, and the signaling message is the QuickConfig message for eHRPD and is modified to include a designated bit that indicates presence or absence of base stations of other wireless networks based on other RATs.

4. The method as in claim 3, wherein:
the second wireless network is based on the Evolved Universal Terrestrial Rradio Access Network (E-UTRAN) wireless technology as the second RAT.

5. The method as in claim 3, wherein:
the second wireless network is based on the Long-Term Evolution (LTE) technology as the second RAT.

6. The method as in claim 3, wherein:
the second wireless network is based on the Worldwide Interoperability for Microwave Access (WiMAX) technology as the second RAT.

7. The method as in claim 1, wherein:
the signaling message includes a designated bit that indicates presence or absence of base stations of other wireless networks based on other RATs, and
the method comprises:
providing in the wireless communication device a list of neighboring base stations of other wireless networks based on other RATs,
when the designated bit indicates presence of base stations of other wireless networks based on other RATs, operating the wireless communication device to search for a second base station based on a second RAT based on the list.

8. The method as in claim 7, comprising:
operating the wireless communication device to have a different randomized wake-up time times calculated using a hash function of a session seed of the wireless communication device.

9. The method as in claim 8, comprising:
operating each of the different wireless communication devices to delay the search for a second base station based on a second RAT based on the list by a backoff timer to extend a delay after a respective wake-up time for the wireless communication device.

10. The method as in claim 7, wherein:
the first wireless network is based on the Evolved High Rate Packet Data (eHRPD) radio access technology as the first RAT, and
the list is a Preferred Roaming List (PRL).

11. The method as in claim 1, wherein:
the signaling message includes a first designated bit that indicates presence or absence of base stations of a first of other wireless networks based on other RATs, and a second designated bit that indicates presence or absence of base stations of a second of other wireless networks based on other RATs.

12. The method as in claim 11, wherein:
the first wireless network is based on the Evolved High Rate Packet Data (eHRPD) radio access technology,
the first designated bit indicates presence or absence of base stations of a wireless network is based on the Evolved Universal Terrestrial Rradio Access Network (E-UTRAN) wireless technology, and
the second designated bit indicates presence or absence of base stations of a wireless network is based on a wireless technology different from the E-UTRAN and eHRPD wireless technologies.

13. The method as in claim 1, comprising:
the signaling message includes a designated bit that indicates presence or absence of base stations of other wireless networks based on other RATs, and
the method comprises:
operating each base station of a wireless communication network based on a respective RAT to send out a second signaling message that includes information on a list of neighboring base stations of other wireless networks based on other RATs;
when the designated bit indicates presence of base stations of other wireless networks based on other RATs, operating the wireless communication device to search for a second base station based on a second RAT based on the information on the list of neighboring base stations of other wireless networks based on other RATs in the second signaling message.

14. The method as in claim 13, comprising:
operating different wireless communication devices served by the two or more wireless networks based on different radio access technologies (RATs) to have different randomized wake-up times without having a separate designated timer to control wake-up times of the different wireless communication devices.

15. The method as in claim 14, comprising:
operating each of the different wireless communication devices to delay the search for a second base station based on a second RAT based on the list by a backoff timer to extend a delay after the randomized wake-up time for the wireless communication device.

16. The method as in claim 1, comprising:
after the base station of the second wireless network is found, switching the wireless communication device from communicating with the first wireless network to communicating with the second wireless network.

17. A system for wireless communications, comprising:
two or more wireless networks based on different radio access technologies (RATs), respectively, each wireless network including base stations that provide wireless communication services based on a respective radio access technology (RAT) of the wireless network, the wireless networks providing wireless communication services to wireless communication devices that are capable of communicating with the wireless networks based on the different RATs;
a signaling mechanism in each of the wireless communication networks to send out a signaling message from each wireless network that indicates absence of base stations of other wireless networks based on other RATs, wherein the signaling message indicates absence of base stations of the second wireless network when the second wireless network does not exist;
a search mechanism that causes each wireless communication device currently being serviced by a first wireless network based on a first RAT not to search for a base station of a second wireless network based on a second RAT when the signaling message indicates absence of base stations of the second wireless network, and to search for a base station of the second wireless network when the signaling message indicates presence of base stations of the second wireless network;
a handoff mechanism that switches the wireless communication device from communicating with the first wireless network to communicating with the second wireless network after the base station of the second wireless network is found; and
a mechanism that causes different wireless communication devices served by the two or more wireless networks based on different RATs to have different randomized wake-up times to control wake-up times of the different wireless communication devices, the different randomized wake-up time causing the wireless communication device to start the search for a base station of the second wireless network at different time from other wireless communication devices when the signaling message indicates presence of base stations of the second wireless network.

18. The system as in claim 17, wherein:
the signaling message includes a designated bit that indicates presence or absence of base stations of other wireless networks based on other RATs, and
the search mechanism further causes the wireless communication device to search for a second base station based on a second RAT based on a list of neighboring base stations of other wireless networks based on other RATs when the designated bit indicates presence of base stations of other wireless networks based on other RATs.

19. The system as in claim 17, wherein:
each of the different wireless communication devices is operated to delay the search for a second base station based on a second RAT based on the list by a backoff timer to extend a delay after a respective wake-up time for the wireless communication device.

20. The system as in claim 17, wherein:
the signaling message includes a designated bit that indicates presence or absence of base stations of other wireless networks based on other RATs, and
each base station of a wireless communication network based on a respective RAT sends out a second signaling message that includes information on a list of neighboring base stations of other wireless networks based on other RATs;
when the designated bit indicates presence of base stations of other wireless networks based on other RATs, the search mechanism causes the wireless communication device to search for a second base station based on a second RAT based on the information on the list of neighboring base stations of other wireless networks based on other RATs in the second signaling message.

21. The system as in claim 20, comprising:
a mechanism that causes different wireless communication devices served by the two or more wireless networks based on different radio access technologies (RATs) to have different randomized wake-up times without having a separate designated timer to control wake-up times of the different wireless communication devices.

22. The system as in claim 21, wherein:
each of the different wireless communication devices is operated to delay the search for a second base station based on a second RAT based on the list by a backoff timer to extend a delay after a respective wake-up time for the wireless communication device.

23. A method for wireless communications, comprising:
providing a wireless communication device that is capable of communicating with a first wireless network based on Evolved High Rate Packet Data (eHRPD) radio access technology and a second wireless network based on the Evolved Universal Terrestrial Rradio Access Network (E-UTRAN) radio access technology, each wireless communication network including base stations that provide wireless communication services to the wireless communication device,
operating the first wireless network based on the eHRPD radio access technology to send out a signaling message that indicates whether base stations of the second wireless network based on the E-UTRAN radio access technology are absent, wherein the signaling message indicates absence of base stations of the second wireless network when the second wireless network does not exist;
controlling the wireless communication device currently being serviced by the first wireless network not to search for a base station of the second wireless network when the signaling message indicates absence of base stations of the second wireless network, and to search for a base station of the second wireless network when the signaling message indicates presence of base stations of the second wireless network; and
after the base station of the second wireless network is found, switching the wireless communication device from communicating with the first wireless network to communicating with the second wireless network, and
wherein the method further including operating different wireless communication devices served by the two or more wireless networks based on different RATs to have different randomized wake-up times to control wake-up times of the different wireless communication devices, the different randomized wake-up time causing the wireless communication device to start the search for a base station of the second wireless network at different time from other wireless communication devices when the signaling message indicates presence of base stations of the second wireless network.

24. The method as in claim 23, wherein:
the signaling message includes a designated bit that indicates presence or absence of base stations of the second wireless network.

25. The method as in claim 24, wherein:
the signaling message includes another designated bit that indicates presence or absence of base stations of a third wireless network based on a radio access technology different from eHRPD and E-UTRAN radio access technologies.

26. A method for wireless communications, comprising:
providing a wireless communication device that is capable of communicating with two or more wireless communication networks based on different radio access technologies (RATs), respectively, each wireless communication network including base stations that provide wireless communication services based on a respective radio access technology (RAT) of the wireless communication network,
operating each base station of a wireless communication network based on a respective RAT to send out a signaling message that indicates absence of base stations of other wireless networks based on other RATs, wherein the signaling message indicates absence of base stations of the second wireless network when the second wireless network does not exist;
controlling the wireless communication device currently being serviced by a first wireless network based on a first RAT not to search for a base station of a second wireless network based on a second RAT when the signaling message indicates absence of base stations of the second wireless network, and to search for a base station of the second wireless network when the signaling message indicates presence of base stations of the second wireless network; and
operating the wireless communication device to have a different randomized wake-up time than that of other wireless communication devices served by the wireless communication network,
wherein:
the signaling message includes a designated bit that indicates presence or absence of base stations of other wireless networks based on other RATs, and
wherein the method further includes:
providing in the wireless communication device a list of neighboring base stations of other wireless networks based on other RATs,
when the designated bit indicates presence of base stations of other wireless networks based on other RATs, operating the wireless communication device to search for a second base station based on a second RAT based on the list, and
operating the wireless communication device to have a different randomized wake-up time times calculated using a hash function of a session seed of the wireless communication device.

27. A method for wireless communications, comprising:
providing a wireless communication device that is capable of communicating with two or more wireless communication networks based on different radio access technologies (RATs), respectively, each wireless communication network including base stations that provide wireless communication services based on a respective radio access technology (RAT) of the wireless communication network,
operating each base station of a wireless communication network based on a respective RAT to send out a signaling message that indicates absence of base stations of other wireless networks based on other RATs, wherein the signaling message indicates absence of base stations of the second wireless network when the second wireless network does not exist;
controlling the wireless communication device currently being serviced by a first wireless network based on a first RAT not to search for a base station of a second wireless network based on a second RAT when the signaling message indicates absence of base stations of the second wireless network, and to search for a base station of the second wireless network when the signaling message indicates presence of base stations of the second wireless network; and
operating the wireless communication device to have a different randomized wake-up time than that of other wireless communication devices served by the wireless communication network,
wherein:
the signaling message includes a designated bit that indicates presence or absence of base stations of other wireless networks based on other RATs, and
wherein the method further includes:
providing in the wireless communication device a list of neighboring base stations of other wireless networks based on other RATs,
when the designated bit indicates presence of base stations of other wireless networks based on other RATs, operating the wireless communication device to search for a second base station based on a second RAT based on the list;
operating the wireless communication device to have a different randomized wake-up time times calculated using a hash function of a session seed of the wireless communication device, and
the method further comprises: operating each of the different wireless communication devices to delay the search for a second base station based on a second RAT based on the list by a backoff timer to extend a delay after a respective wake-up time for the wireless communication device.

\* \* \* \* \*